United States Patent

Lee

[15] 3,697,808
[45] Oct. 10, 1972

[54] SYSTEM FOR MONITORING CHASSIS POTENTIAL AND GROUND CONTINUITY

[72] Inventor: Joo Chan Lee, Lindenhurst, Ill.

[73] Assignee: The Safety Company, St. Charles, Ill.

[22] Filed: Nov. 23, 1970

[21] Appl. No.: 91,617

[52] U.S. Cl..............................317/18 A, 317/18 B
[51] Int. Cl..............................................H02h 1/02
[58] Field of Search...317/9 A, 10, 18 R, 18 A, 18 B, 317/18 C, 18 D

[56] References Cited

UNITED STATES PATENTS

| | | | |
|---|---|---|---|
| 3,196,316 | 7/1965 | Crom | 317/18 C |
| 3,233,151 | 2/1966 | Fischer | 317/18 B |

FOREIGN PATENTS OR APPLICATIONS

| | | | |
|---|---|---|---|
| 236,500 | 11/1961 | Australia | 317/18 A |
| 794,106 | 4/1958 | Great Britain | 317/18 B |

Primary Examiner—D. X. Sliney
Attorney—Harry Mansen

[57] ABSTRACT

A monitoring system controls the application of power from a grounded power source to an electrical load in a chassis connected to the source by the line, neutral and ground leads of a power cable. Control is exerted by monitoring the level of leakage power current flowing in the ground lead of the cable and disconnecting the power source from the line lead of the cable when the level is such that a 5 millivolt drop would occur across the ground lead. This maintains the chassis at a potential of no more than 5 millivolts with respect to ground. An RF signal injected into the neutral lead of the cable causes RF current to flow in the ground lead by reason of the capacitive coupling between the load and the chassis when continuity exists between the chassis and the source ground. The RF current is monitored in order to disconnect the power source when such current drops below a predetermined level indicating that an inadequate or insufficient connection exists between the chassis and ground, situations that interfere with properly monitoring the level of leakage power current through the ground lead.

23 Claims, 11 Drawing Figures

Fig. 1

INVENTOR.
JOO C. LEE
BY
Paul + Paul
ATTORNEYS.

Fig. 2

INVENTOR.
JOO C. LEE

BY Paul & Paul
ATTORNEYS.

INVENTOR.
JOO C. LEE

BY

Paul & Paul

ATTORNEYS.

SYSTEM FOR MONITORING CHASSIS POTENTIAL AND GROUND CONTINUITY

BRIEF SUMMARY OF THE INVENTION

This invention relates to a system for monitoring the potential of a chassis above ground when the chassis is connected to a grounded power source, and for monitoring ground continuity.

The need for a system of the type described arises because of the evermore complicated and sophisticated electronic equipment being developed and used in the medical field for diagnostic and treatment purposes. When electronic medical equipment such as monitoring instruments, pace makers, neural stimulators, or saline-filled catheters are applied to a patient, he is particularly vulnerable to what would normally be considered nuisance leakage current from the equipment. Such leakage current develops by reason of the capacitance, inductance and conductance associated with the electronic circuitry of the equipment interacting with itself and the chassis containing the circuitry. The more intimately the equipment applies electricity to a patient and the more fragile his condition, the more critical becomes the protective measures required to assure his safety from the hazards of leakage current.

The worse case condition arises in using underskin or internal electrodes such as catheters inserted in the great vessels of a patient, or electrodes implanted about the heart. These procedures, in widespread use at the present time, establish an artificial low impedance path for electrical current through the heart. The level of such current to induce premature systole and ventricular fibrillation has been found from experiments on animals and humans to be about 10 microamperes at normal power line frequencies, 50 to 60 Hz. The impedance of tissues in this current path is only about 500 ohms, with the result that a 5 millivolt voltage gradient across this path is lethal.

In the usual treatment situation, the patient is well grounded. Following good practice, the equipment used is also grounded, usually through the ground lead of the standard 3-lead power cable by which the equipment is connected to the power source. But this practice is not good enough where the treatment involves using internal electrodes because a 5 millivolt potential difference between the chassis carrying the equipment and the power system ground will permit lethal current to flow through the heart of a grounded patient.

Such a 5 millivolt potential difference can arise by reason of leakage current flowing from the circuitry to ground through the ground lead of the power cable. For example, a leakage current of 200 milliamperes flowing in the No. 14 AWG solid copper ground wire used in a standard 10 foot power cable connecting a chassis to a grounded power source will place the chassis at 5 millivolts above ground. A current of this magnitude could arise due to capacitor or insulation failure in the circuitry of the chassis. Such failure, coupled with a break in continuity of the connection to ground, would have disastrous consequences to an instrumented patient.

While it is possible to design an electrical system which precludes the hazards mentioned above, such system would require isolation transformers to isolate electrical receptacles into which equipment can be connected to the power source, isolation transformers in the equipment itself to further isolate the equipment chassis and patient leads, and common busing of ground connections through heavy conductors. Universal adaption of so-called "safe power centers" would involve complete rewiring and rebuilding of every hospital and doctor's office to accomplish the necessary grounding. And even this approach would not provide any assurance that the ground lead in the power cable provides continuity from the equipment being used to the system ground. Regardless of future wiring improvements, it is apparent that, for some time, thousands of patients will continue to be treated under existing conditions that produce a high probability of fatal consequences in the event of an electrical fault in the equipment being used. The primary object of this invention, therefore, is to provide a monitor system compatable with existing power sources and medical equipment, and capable of monitoring the chassis potential above ground as well as the continuity of the ground connection so that equipment can be disconnected from the power source before a dangerous potential is reached, or whenever the ground connection becomes discontinuous or a ground fault occurs.

Briefly, the monitoring system of the present invention contemplates the use of a monitoring module mounted either in a housing that provides a 3 contact receptacle for a standard 3 contact power cable or in the electrical equipment itself. The level of 60 Hz leakage power current flowing in the ground lead of the power cable is sensed by a current transformer coupled to this lead. The rectified output of the current transformer generates bias in an active device effective to operate a two state control when such bias is representative of the level of leakage power current in the ground lead sufficient to raise the chassis to a predetermined potential, such as 5 millivolts, above ground. At lower levels of leakage power current, the two-state control enables a power switch to apply power to the load in the equipment. At the critical level of leakage power current, the resultant switching of the two-state control disables the solid state device and disconnects power from the load.

Low levels of leakage power current in the ground lead may be indicative of a safe condition, or may be caused by a poor connection between the chassis and the ground lead, or an undesired chassis grounding. In the case of a poor connection, the potential of the chassis above ground may exceed the safe limits despite monitoring of the leakage power current. An undesired chassis grounding (ground fault) also can be dangerous. It is essential, therefore, to monitor the continuity of the connection between the chassis and ground whenever the leakage power current is being monitored. To this end, an RF signal generator is used to inject an RF signal into the neutral lead. The inherent coupling between the load and the chassis provides a low impedance path for this signal between the neutral and ground leads in the power cable resulting in the flow of RF current in the ground lead. Such current is detected using a current transformer whose rectified output generates bias for an active device which is effective to switch the two-state control to a state that disables the power switch and disconnects power from the load when the RF current falls below a predetermined level. Any break or discontinuity in the ground connection will reduce the flow of RF current in the ground lead; and any ground fault associated with the chassis or wiring system will provide an auxiliary path for the RF current also reducing its flow in the ground lead.

The need to separately monitor the leakage power current is eliminated by providing for the last mentioned current transformer to be saturated by the flow of leakage power current at the critical level. The flow of such current at the critical level will prevent the transfer of RF energy through the transformer with the result that rectified RF current will decrease causing the monitoring circuitry to respond by disconnecting power from the load as if a discontinuity in the ground circuit has occurred.

The more important features of this invention have thus been outlined rather broadly in order that the detailed description thereof that follows may be better understood, and in order that the contribution to the art may be better appreciated. There are, of course, additional features of the invention that will be described hereinafter and which will also form the subject of the claims appended hereto. Those skilled in the art will appreciate that the conception upon which this disclosure is based may readily be utilized as a basis for designing other structures for carrying out the several purposes of this invention. It is important, therefore, that the claims to be granted herein shall be of sufficient breadth to prevent the appropriation of this invention by those skilled in the art.

BRIEF DESCRIPTION OF VIEWS OF THE DRAWING

For a more complete understanding of the nature and objects of the invention, reference should be had to the following detailed description taken in connection with the accompanying drawings wherein.

Figure 1:
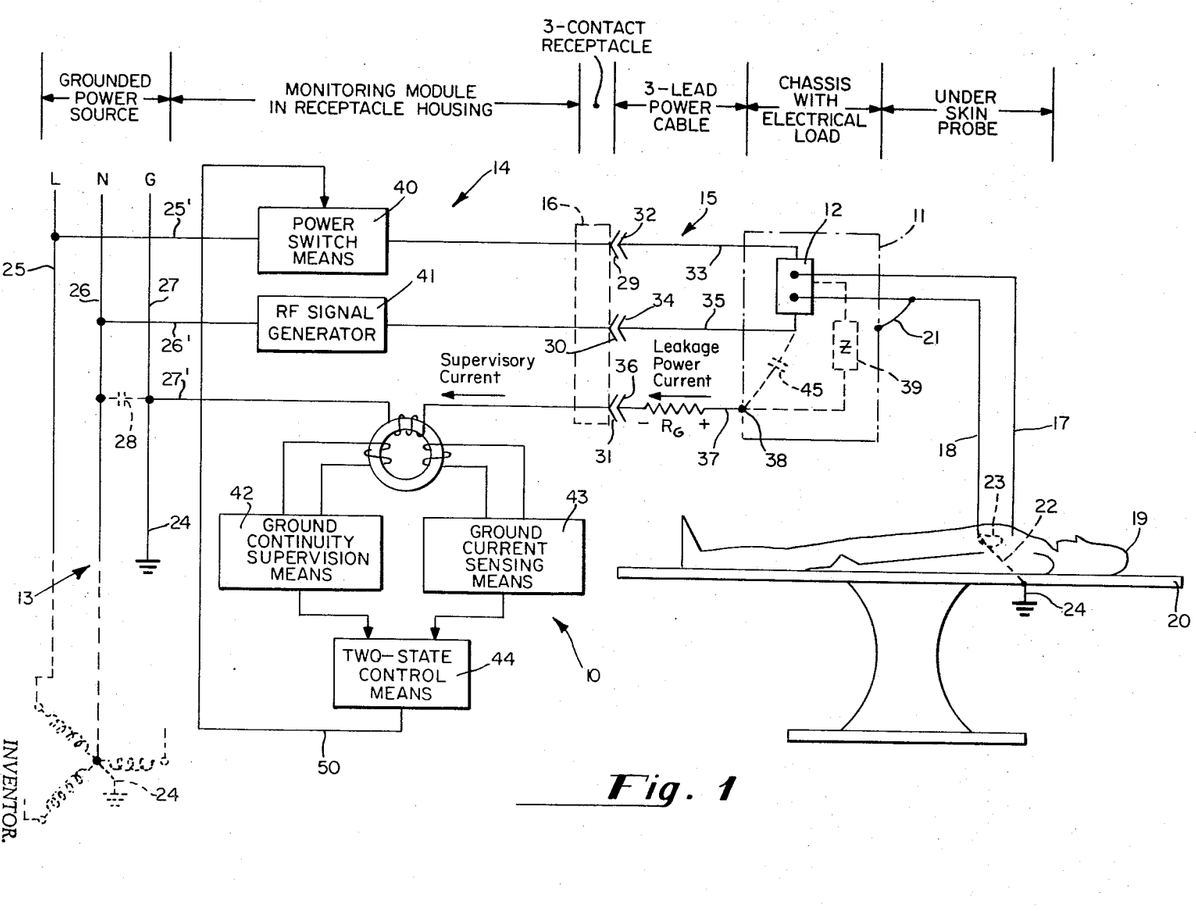
FIG. 1 is a block diagram showing the invention for protecting a patient against lethal shock incorporated into a wall receptacle.

Referring now to FIG. 1, reference numeral 10 designates a monitoring system by which a chassis 11 containing an electrical load 12 is connected to a grounded power source 13 through a monitoring module 14 by means of a 3-lead power cable 15 plugged into receptacle 16. In the embodiment illustrated in FIG. 1, receptacle 16 is attached to a housing (not shown) in which module 14 is mounted.

Chassis 11 is representative of any type of electronic equipment used for modern medical diagnostic or treatment purposes. For example, chassis 11 may house an oscilloscope for monitoring a heart pacer (not shown) by means of leads 17, 18 implanted in the chest of a patient in contact with a grounded support 20. Lead 18 is grounded to chassis 11 through bus connection 21. As a consequence, a low impedance path, designated by the broken line 22, exists through the patient's heat 23 from the chassis 11 sufficient to raise the potential of the chassis 5 millivolts above the power system ground will cause an A.C. current of 10 microamperes to flow through the patient's heart. It is well established that a current of this magnitude is capable of causing ventricular fibrillation, a situation to be avoided at all costs in a patient. Consequently, monitoring module 14 must be effective to disconnect power from chassis 11 when its potential approaches 5 millivolts above the power system ground.

Power source 13 is illustrative of a typical single phase 120 V.A.C., 60 Hz, 15 ampere wiring system branching from a fused switchbox (not shown) to service a receptacle 16. Source 13 may be the between-the-wall wiring in a building, and includes line bus 25, neutral bus 26, and ground bus 27, the latter two being connected to the power system ground 24. Line bus 25 is at a potential of approximately 120 V.A.C. with respect to neutral bus 26 which is maintained at the power system ground potential by means of the grounding of the neutral of the power transformer. In effect, the conductor capacitance between bus 26 and bus 27 is very large, and is equivalent to a large valued capacitor symbolically designated by reference numeral 28. Normally, jumper wires 25', 26' and 27' would be spliced to each of buses 25, 26 and 27 to connect line contact 29, neutral contact 30 and ground contact 31 of wall-mounted receptacle 16 directly to the corresponding buses of the power source. When the plug (not shown) of power cable 15 is inserted into receptacle 16, plug contact 32 electrically connects line lead 33 of the cable to line contact 29, plug contact 34 electrically connects neutral lead 35 to neutral contact 30, and plug contact 36 electrically connects ground lead 37 to ground contact 31. Ground lead 37 is connected to the chassis at low resistance junction 38. Normally, the power line voltage is at all times applied across contact 29 and 30, and hence across load 12, and the coupling (represented by impedance 39) between the internal wiring and components of the load, on the one hand, and the chassis, on the other, results in the flow of leakage current through the ground lead 37 of the power cable and jumper lead 27' into the system ground 24. Much of the leakage current will be at the power line frequency, 50 Hz to 60 Hz; and this leakage, which is most serious to the patient, is termed "leakage power current."

With a standard power cable 10 feet long having a No. 14 AWG solid copper ground lead, the resistance of the ground lead ($R_G$) is about 0.026 ohms, which is about 20,000 times smaller than the resistance of path 22 through the patient. Where the coupling between the load and the chassis is such as to give rise to a power leakage current of 200 milliamperes flowing through ground lead 37 of the power cable, the chassis will be held at a potential of 5 millivolts above the power system ground. For a 20 foot cable, only 100 milliamperes of power leakage current will achieve this result; while 400 milliamperes are required when the cable is 5 feet long.

In the present invention, module 14 is interposed between the power source 13 and receptacle 16 for the purposes of monitoring the flow of leakage power current in the ground lead, and selectively connecting the line bus 25 to line contact 29 in receptacle 16. Module 14 comprises power switch means 40, RF signal generator 41, ground continuity supervision means 42, ground current sensing means 43 and two-state control means 44. Power switch means 40 is preferably a solid state device connected by jumper lead 25' from line bus 25 to line contact 29 of receptacle 16, although an electro-mechanical device could be used if desired. The power switch means is controlled via coupling-link 50 by two-state control means 44 which has a first state that enables the switch means (e.g., connects the line bus to the line contact), and a second state that disables the switch means (e.g., disconnects the line bus from the line contact). The state of control means 44 is determined, at least in part, by sensing means 43 which is responsive to the level of leakage power current flowing in ground lead 37 (and hence, is also responsive to the potential difference between chassis 11 and power source ground 24). As long as the level of such current does not exceed a predetermined value (i.e., 200 milliamperes when a 10 foot cable with a No. 14 AWG solid copper ground wire is used), sensing means 43 has no effect on the state of control means 44. If the latter is in its first state (e.g., switch means 40 enabled), it remains in this state. When, however, the level of leakage power current reaches the predetermined value, sensing means 43 operates and places control means 44 in its second state thereby disabling switch means 40 and disconnecting load 12 from power source 13.

From the above description, it should be apparent that sensing means 43 can properly influence switch means 40 only to the extent that continuity is maintained between chassis 11 and ground contact 31. For example, if connection 38 (by which ground lead 37 in the power cable is connected to chassis 11) were lost, some leakage power current may flow into ground contact 31 due to the capacitive coupling between the leads in cable 15; but at 60 Hz, the level of current would be very low and sensing means 43 would exert no influence on control means 44. Any subsequent failure by which coupling impedance 39 would pass significant power current into the chassis would go undetected by sensing means 43 by reason of the lost connection 38, and such leakage power current would pass through low impedance path 22 to ground 24 with lethal consequences to patient 19. For sensing means 43 to be effective, therefore, it is essential to maintain continuity between the chassis and ground.

The cooperation between RF signal generator 41, ground continuity sensing means 42 and control means 44 provides for the monitoring this continuity. Generator 41 is preferably interposed between line bus 26 and line contact 30 of receptacle 16 by way of jumper lead 26'; and serves to inject a low level RF signal, from 20 to 300 KHz, but preferably about 100 KHz, into neutral lead 35 of the power cable. Because of the frequency of such signal, there will be considerable coupling between leads 35 and 37 in the power cable due to the capacitance between the conductors of the cable, and between the wiring in the load and the chassis. Such coupling is represented in FIG. 1 by the capacitor 45 interconnecting leads 35 and 37. The RF signal path starting from bus 26, passes through jumper lead 26', generator 41, neutral lead 35, coupling capacitor 45, lead 37, supervision means 42, jumper lead 27', to bus 27, and then through bus 28 back to bus 26. As long as connection 38 is sound, no break exists in lead 37, and contacts 31 and 36 are properly engaged, and no undesirable current paths exist, RF current greater than a predetermined level will flow through ground contact 31.

Supervision means 42 is responsive to the level of RF current (termed supervisory current for reference purposes) flowing through ground contact 31 for operating control means 44. As long as the level of supervisory current exceeds a predetermined value, supervision means 42 holds control means 44 in its first state (power supply enabled), subject to the influence exerted on the control means by sensing means 43. When, however, the level of supervisory current decreases below the predetermined value, supervision means 42 operates and places control means 44 in its second state thereby disabling switch means 40 and disconnecting load 12 from power source 13. In this manner, sensing means 43 will always be effective to detect a dangerous rise in chassis potential; and power will be disconnected any time sensing means 43 would not be effective.

From the above description, control means 44 is in its first state only when two events occur simultaneously: the leakage power current is less than its predetermined value, and the supervisory current is more than it predetermined value. Control means 44 is in its second state whenever the supervisory current is less than its predetermined value independently of the level of leakage power current. For this reason, when both supervision means 42 and sensing means 43 are present simultaneously in the monitoring module, each of these means determines, at least in part, the state of control means 44.

Reviewing briefly, the predetermined value of leakage power current above which sensing means 43 is responsive to operate control means 44 is dependent upon the length of power cable 15, the size of the ground wire, and the chassis potential at which it is desired to remove power from the load. As indicated previously, the predetermined value of leakage power current for a 10 foot cable using a No. 14 AWG solid copper ground wire is about 200 milliamperes if the power is to be removed when the chassis reaches 5 millivolts above ground. On the other hand, the predetermined value of supervisory current below which supervision means 42 is responsive to operate control means 44 is dependent essentially on the length of the power cable, the type of insulation, and conductor location. For example, if the cord in use has a coupling capacitance of 200 picofarads, the impedance of this cord at 100 KHz is only about 7,500 ohms. With connection 38 between the ground lead 37 and chassis 11 open (e.g., a discontinuity in the ground circuit), considerable supervisory current flows through ground contact 31 as a consequence of the injection of the RF signal into neutral lead 35, and the value of such current establishes the predetermined value of supervisory current.

Figure 2:
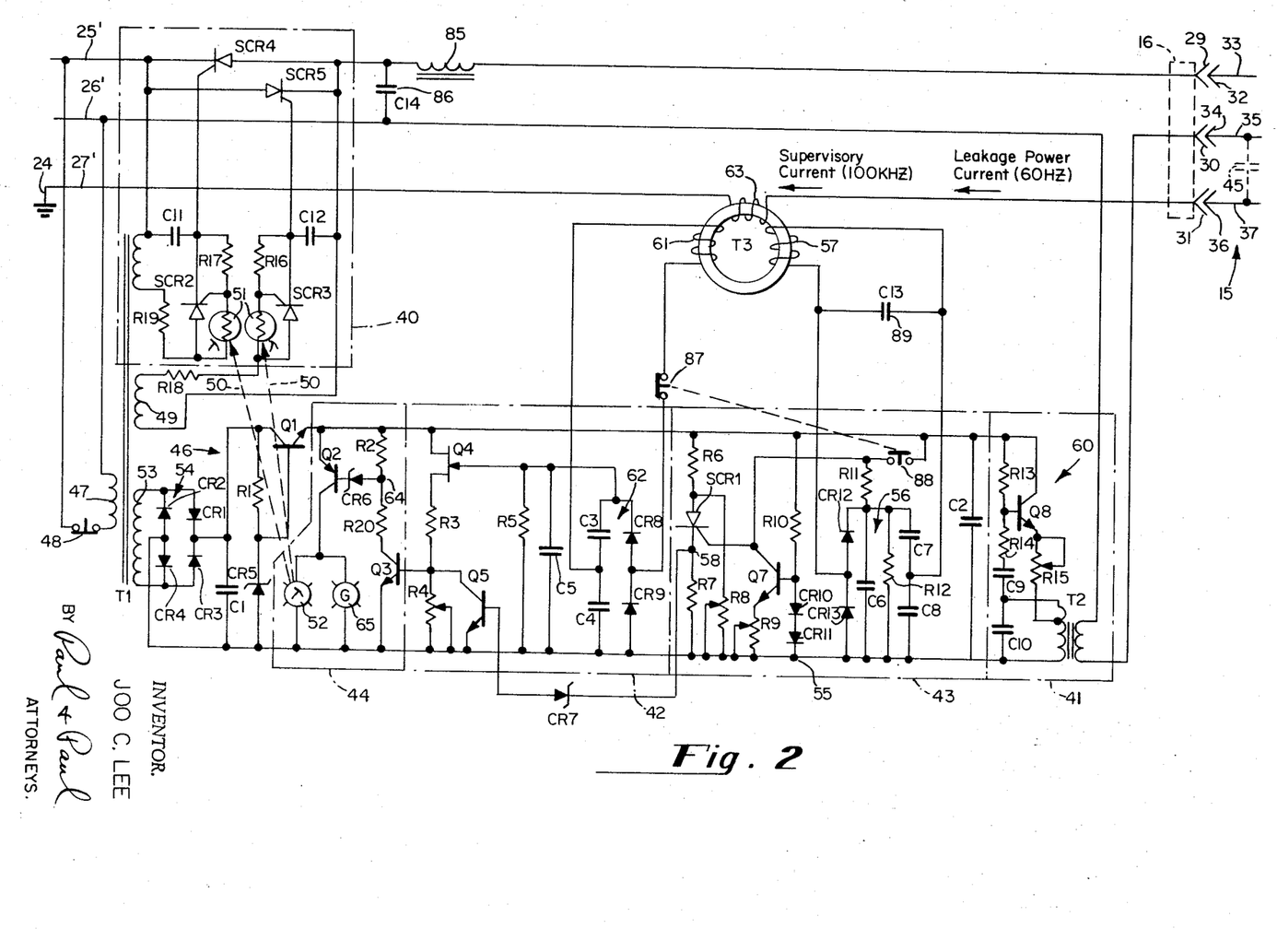
FIG. 2 is a circuit diagram of the monitor module shown in block diagram form in FIG. 1.

Details of the preferred circuitry of module 14 are shown in FIG. 2 to which reference is now made. The power supply for module 14, omitted from the block diagram of FIG. 1 for purposes of simplification, includes transformer T1 and Zener regulated power supply 46. Primary 47 of transformer T1, connected directly across line jumper 25' and neutral jumper 26', is energized at all times except when normally closed reset button 48 is manually opened. Secondary windings 49 of transformer T1 provide power to operate switch means 40. As long as photoconductors 51 associated with controlled rectifiers SCR 2 and SCR 3 provide a low impedance shunt path, controlled rectifiers SCR 4 and SCR 5 will be fired properly to apply line voltage from bus 25 to line contact 29 of receptacle 16. The impedance of photoconductors 51 will be low (about 500 ohms) as long as they are illuminated by light rays 50 emanating from lamp 52 which is a part of two-state control means 44. When lamp 52 is extinguished, photoconductors 51 will no longer be illuminated and their impedances will become very large (about 5 megohms) with respect to bias resistors R 17 and R 16 thus reducing the gate bias of rectifiers SCR 2 and SCR 3 causing them to turn off. This action reduces the gate bias of rectifiers SCR 4 and SCR 5 turning them off and disconnecting power to line contact 29. Lamp 52 is illuminated while transistor Q2 conducts and is extinguished when the transistor is cut-off. In summary, switch means 40 will be enabled when control means 44 is in its first state (e.g., transistor Q2 is conducting and lamp 52 is illuminated); and switch means 40 will be disabled when control means 44 is in its second state (e.g., transistor Q2 is cut-off and lamp 52 is extinguished).

Rectifier driver 46, which provides power for RF generator 41, supervision means 42, sensing means 42 and control means 44, includes secondary winding 53 driving rectifier 54 which provides proper bias for conduction of emitter follower Q1.

A. Operation with Chassis Safe, Ground Continuous

Assuming cable 15 is plugged into receptacle 16 and chassis 11 has no defects, the level of leakage power current flowing in lead 37 to ground 24 through ground jumper 27' will be less than its predetermined value, and the level of supervisory current flowing in ground jumper 27' to ground will be more than its predetermined value: control means 44 will be in its first state and power switch means 40 will be enabled.

1. Operation of Sensing Means 43

Diodes CR10 and CR11 in series with resistor R10 are forwardly biased by the conduction of emitter follower Q1 thus holding the base of transistor Q7 at about 1.4 volts above reference 55 when the diodes are silicon. The base-emitter junction of this transistor will be forwardly biased as long as the value of emitter current flowing through potentiometer R9 does not raise the voltage at the emitter to about 0.7 volts above reference 55 (there being a drop across this junction of about 0.7 volts when the silicon transistor conducts).

The input to voltage doubler 56 is across the secondary winding 57 of current transformer T3 whose primary 63 is in series with ground jumper 27' connected to ground bus 27. Secondary 57 has several times as many turns as primary 63, preferably about 2 ½ times as many. If the predetermined value of leakage power current is 200 milliamperes, for example, the chassis potential will be less than 5 millivolts above the power source ground as long as the leakage current is less than 200 milliamperes. Assuming, for example, about 100 milliamperes at 60 Hz is flowing through the ground jumper 27' and primary 63, about 40 milliamperes will flow through secondary 57 into doubler 56. The output of this doubler will reverse-bias the collector-base junction of transistor Q7, and the latter will be in its active state. Being in such state, the gate electrode of controlled rectifier SCR1 is connected to reference 55 through a constant current source represented by the collector circuit of transistor Q7 in shunt with doubler 56 and secondary winding 57. Insufficient power is available from this combination to trigger controlled rectifier SCR1 which will remain non-conductive without significant current flowing through resistor R7. Node 58 between the cathode of SCR1 and resistor R7 thus will be at substantially the potential of reference 55 with the result that transistor Q5 will be non-conductive because its base-emitter junction is not forward biased. Node 59, tied to the collector of transistor Q5, in the source lead circuit of N-channel field effect transistor (F.E.T.) Q4, will have no effect on the state of transistor Q2 which is the primary active element in control means 44, until the output doubler 56 is such as to permit the emitter current in transistor Q7 to raise the voltage at the emitter to a value at which this transistor is cut-off.

2. Operation of RF Generator 41

Generator 41 comprises feed back oscillator 60 which develops a 100 KHz sine-wave signal across the tuned tank in the emitter-base circuit of transistor Q8 which includes transformer T2. The secondary of this transformer is constituted by a few turns (preferably about five) of wire heavy enough to carry rated load current for the receptacle since the secondary is in series with neutral jumper 26' and thus carries the entire load current. The signal appearing across the secondary is about 2 volts P.T.P. at 100 KHz; and the current is of the order of magnitude of 10 to 50 microamperes. As indicated previously, the 100 KHz signal is coupled to ground jumper 27' via impedance 45 which represents the capacitive coupling between leads 35 and 37 in cable 15 and between the circuitry in load 12 and chassis 11. As a consequence, a 100 KHz current (termed supervisory current) flows in ground jumper 27' through the primary 63 of transformer T3.

3. Operation of Supervision Means 42

Secondary 61 of T3 couples the supervisory current flowing in ground jumper 27' into voltage-doubler 62 of supervision means 42. The output of doubler 62 is applied across a bias load comprising resistor R5 and capacitor C5 to source lead of F.E.T. Q4. When the value of supervisory current in ground jumper 27' is more than its predetermined level (established by the value of resistor R5), sufficient current will flow through the bias load to properly bias F.E.T. Q4 into conduction. Consequently, the full voltage at the source of transistor Q4 will be developed across resistors R3 and R4; and the resultant flow of current will hold the voltage at node 59 above reference 55 and maintain a forward bias on the base-emitter junction of transistor Q3 which will be saturated holding node 64 at substantially the potential of reference 55. As a consequence, Zener diode CR6 will be reverse-biased holding the base of transistor Q2 at a negative voltage relative to the emitter of transistor Q2 which is of the P-N-P type. The emitter-base junction of this transistor will be forwardly biased into saturation applying the full voltage at the emitter of transistor Q1 across the parallel combination of control lamp 52 and indicator lamp 65 of control means 44.

4. Summary of Operations

For this state of affairs, the following chart summarizes the status of each of the various components described above:

| Component | Status |
| --- | --- |
| Sensing Means 43 | inoperative |
| Transistor Q7 | conducting (saturated) |
| SCR1 | cut-off |
| Transistor Q5 | cut-off |
| Supervision Means 42 | inoperative |
| F.E.T. Q4 | conducting |
| Control Means 44 | first state |
| Transistor Q3 | conducting |
| Transistor Q2 | conducting |
| Lamps 52 & 65 | illuminated |
| Power Switch Means 40 | enabled |

Note that lamp 65 acts as an indicator to signal that power is applied to the load.

B. Operation When Chassis Becomes Unsafe; But Ground is Continuous

1. Operation of Current Sensing Means 43

When the leakage current reaches its predetermined level indicative of an unsafe chassis potential, the collector current of transistor Q7 will be such that the resultant emitter current produces a voltage drop across potentiometer R9 that reverse biases the base-emitter junction cutting off conduction. When this occurs, the entire output of doubler 56 is applied to the gate electrode of controlled rectifier SCR1. Sufficient power is now available to trigger rectifier SCR1 which begins to conduct causing current to flow in resistor R7. Such flow raises the voltage at node 58 causing Zener diode CR7 to be reverse-biased and the emitter-base junction of transistor Q5 to be forwardly biased to a potential just below the potential at node 58. Transistor Q5 saturates causing the voltage at node 59 in its collector to be held at approximately the voltage of reference 55.

2. Operation of Control Means 44

Because the base of transistor Q3 is connected to node 59, the saturation of transistor Q5 will cause transistor Q3 to stop conducting. The voltage at node 64 will rise to the emitter voltage of transistors Q1 and Q2 with the result that Zener diode CR6 will no longer be reverse biased. The base-emitter junction of transistor Q2 will no longer be forward-biased halting conduction of this transistor. At cut-off, lamps 52 and 65 will be extinguished.

3. Operation of Switch Means 40

When lamp 52 is extinguished, photo-links 50 to photoconductors 51 will be destroyed. Switch means 40 will thereupon be disabled connecting power from line contact 29.

4. Summary of Operations

For this state of affairs, the following chart summarizes the status of the various components described above:

| Component | Status |
| --- | --- |
| sensing Means 43 | operative |
| Transistor Q7 | cut-off |
| SCR1 | conducting |
| Transistor Q5 | conducting (saturated) |
| Supervision Means 42 | inoperative |
| F.E.T. Q4 | conducting |
| Control Means 44 | second state |
| Transistor Q3 | cut-off |
| Transistor Q2 | cut-off |
| Lamps 52 & 65 | extinguished |
| Power Switch Means 40 | disabled |

Note that the lack of illumination of lamp 65 acts as an indicator that power has been removed from the load.

C. Operation when Ground Discontinuous

1. Operation of Supervision Means 42

When the level of supervisory current falls below its predetermined level indicative of a discontinuity in the ground circuit linking the chassis to the power system ground or of an undesired low impedance path, the output of doubler 62 will not be sufficient to maintain the conduction of field effect transistor Q4. When this transistor cuts-off, the voltage at node 59 drops to the voltage of reference 55.

2. Operation of Control Means 44

With the voltage at node 59 at the voltage of reference 55, transistor Q3 will no longer be forwardly biased, and the voltage at node 64 will rise to the emitter voltage of transistor Q1. In this event, Zener diode CR6 will no longer be reverse biased and the base of transistor Q2 will be essentially disconnected from node 64 stopping conduction. The cut-off of transistor Q2 extinguishes lamps 52 and 65.

3. Summary of Operations

When the supervisory current is less than its predetermined value, field effect transistor Q4 will cut-off extinguishing lamps 52 and 65 independently of the status of sensing means 43.

D. Neutral Conductor Shorted to Chassis

A defect in the electrical equipment can result in accidental contact between the neutral conductor of the power cable and the chassis or the ground conductor. Under some circumstances this can be a dangerous situation; and the RF generator 41 is designed to take this possibility into account by automatically switching to a quiescent state when a low impedance is connected across the secondary or output side of transformer T2 by which the RF signal is normally injected into the neutral lead of the power cable. Oscillator 60 of generator 41 is of the so-called single-ended type wherein resistor R15 serves to prevent reverse current flow due to the inductive reactance of the tank circuit formed by capacitor C10 and the emitter primary winding of transformer T2. Resistor R15 also limits the emitter current, so that when the output of transformer T2 is shorted by a low impedance (e.g., neutral lead touches chassis), the resultant high value of emitter current through resistor R15 will raise the voltage of the emitter of transistor Q8 interfering with the oscillations of the circuit. As a consequence, no RF signal will be injected into the neutral lead. This result is interpreted by supervision means 42 as a discontinuity in the ground connection whereupon the power switch means will be disabled to disconnect power from the load. The potentially dangerous situation will have to be corrected before power can be re-applied to the load.

E. Operation of Re-set Button 48

When a defect in the load occurs causing sensing means 43 to operate control means 44, rectifier SCR1 remains conducting even though power is disconnected from the load. After the defect in the load is corrected, power can be re-applied to the load only after first stopping conduction of rectifier SCR1. This is achieved by manually depressing reset button 48 which opens the primary of transformer T1 and turns-off the power supply 46. Transistor Q1 stops conducting, the current flow to rectifier SCR1 is cut-off, and the gate electrode resumes control over the state of rectifier SCR1. When reset button 48 is released, power is again applied to the load provided the defect has been remedied.

F. Establishment of Predetermined Level of Leakage Power Current

The setting of potentiometer R9 will establish the critical value of collector current of transistor Q7 at which the resultant flow of emitter current will reverse bias the base-emitter junction of the transistor. The value of leakage power current flowing in ground jumper 27' that results in the critical value of collector current in transistor Q7 is the so-called predetermined level of leakage power current. Such level is determined by the resistance of ground lead 37 which is dependent upon the length of the lead, and the size and type of conductor used. By providing potentiometer R9, a wide range of different types of ground leads and lengths of cable can be accommodated. Obviously, potentiometer R8 can be calibrated in cable length, for example.

G. Overload Protection

The entire 60 Hz load current flows through ground jumper 27' and hence through the secondary of transformer T2 by which the 100 KHz signal is injected into the system. By arranging for the core of transformer T2 to saturate at, for example, 120 percent of the rated load current for the receptacle, overload protection is built into module 14. When the 60 Hz current saturates the core, the 100 KHz signal in the primary of transformer T2 will no longer be coupled through the core to the secondary. Under this condition, no supervisory current will flow in ground jumper 27', and supervision circuit 42 will operate control means 44 thereby disconnecting power from the load. A condition of overload of rated power appears to the supervision means as a discontinuity in the ground connection and affects such means accordingly.

H. RF Choke

To insure that none of the RF signal produced by RF generator 41 is injected into the power source 13 where it could possibly be detected in another monitoring module, an RF choke is inserted in line jumper 25'. Such choke consists of an RF inductor 85 in series with power switch means 40 and a shunt capacitor 86 connected between line jumper 25' and neutral jumper 26'.

I. Test Feature

In order to determine whether supervision means 42 and sensing means 43 are operating correctly, manual test switches 87 and 88 are provided. Switch 87 in the secondary 61 of transformer T3 is normally closed; and switch 88 connecting the emitter of transistor Q1 to the gate electrode of rectifier SCR1 is normally open. Both switches are operated simultaneously by manual depression of a single push botton.

The test mode of module 14 is carried out before load 12 is energized, e.g., when power cable 15 is plugged into receptacle 16, but the on-off switch of chassis 11 is turned to "off" position. Under this condition, sufficient supervisory current should be flowing, and no leakage power current should be present. If the circuitry of module 14 is operating correctly, a decrease in the level of supervisory current, or an increase in leakage power current abouts its predetermined level should cause switch means 40 to be disabled.

When switch 87 opens, and switch 88 closes, rectifier 62 in supervision means 42 is deprived of an input, and the emitter voltage of transistor Q1 is applied to the gate electrode of rectifier SCR1. Each of these events should switch control means 44 to its second state thereby disabling switch means 40. The latter situation is evidenced by extinguishment of indicator lamp 65 when switches 87 and 88 are operated. When these switches are released, switch 77 closes and switch 78 opens. If the circuitry of module 14 is operating properly, switch means 40 does to its first state again enabling switch means 40. This is evidenced by illumination of indicator lamp 65.

J. Modifications

1. Discrimination of 60 Hz and 100 KHz Currents

The signal appearing in secondary winding 57 of transformer T3 includes 100 KHz current as well as 60 Hz current. The level of 60 Hz current is, however, much greater than the level of 100 KHz current. Because transistor Q7 responds to increasing levels of 60 Hz current as the chassis potential rises, the presence of the smaller 100 KHz current will not interfere with the proper operation of current sensing means 43. If necessary, however, a low pass filter to attenuate the 100 KHz signal can be installed across secondary winding 57 as indicated by shunt capacitor 89.

On the other hand, field effect transistor Q4 responds to decreasing levels of 100 KHz current as the ground discontinuity occurs. Secondary winding 61 of transformer T3 will contain an appreciable level of 60 Hz current, whose presence may interfere with proper cut-off of field effect transistor Q4. Where interference occurs, a 60 Hz attenuator can be inserted across secondary 61 so that the input to rectifier 62 is essentially limited to the 100 KHz current.

2. RF Signal Injection

While the RF signal is shown and described as being injected into neutral lead 35 of the cable, it is also possible to inject such signal into the line lead 33 of the cable at a point between choke 85, 86 and the load.

The level of supervisory current that flows is ground jumper 27' will be materially increased by providing artificial coupling in the chassis between the node where the neutral lead enters the load in the chassis and the node 38 where the ground lead is attached to the chassis. Such artificial coupling can be in the form of a capacitor of value several times larger than the leakage capacitance associated with the cable itself. This approach renders the operation of the ground continuity sensing means less sensitive to cable length or type of cable.

3. Electro-mechanical Power Switch Means

Figure 3:
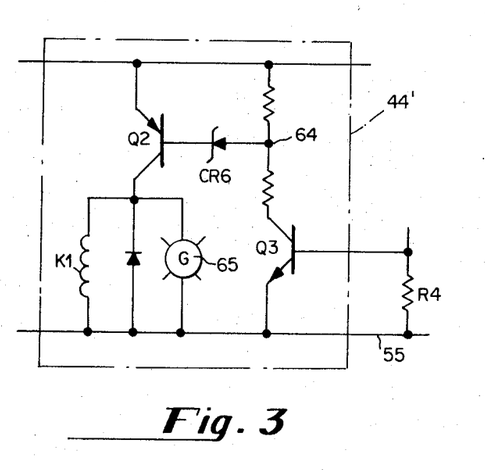
FIG. 3 is a second embodiment of the control means shown in FIG. 2.
Figure 4:
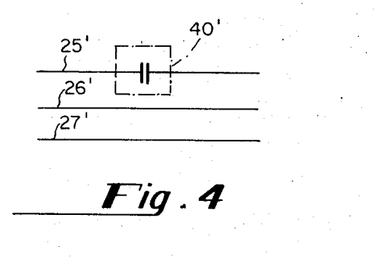
FIG. 4 is a second embodiment of the power switch means shown in FIG. 2.

Power switch means 40 is shown in FIG. 2 as a solid state switch. It can also be the normally open contacts of a relay whose coil replaces lamp 52 as shown in FIG. 3. The contacts of switch means 40' shown in FIG. 4 are in series with line jumper 25' so that line bus 25 is applied to line contact 29 in receptacle 16 only when the contacts are closed. Conduction of transistor Q2 in control means 44' energizes the relay coil K1 and holds the contacts k1 closed until either the supervision means or sensing means operates to de-energize transistor Q2, at which time coil K1 would be de-energized and the contacts k1 opened.

4. Overload Protection

Figure 5:
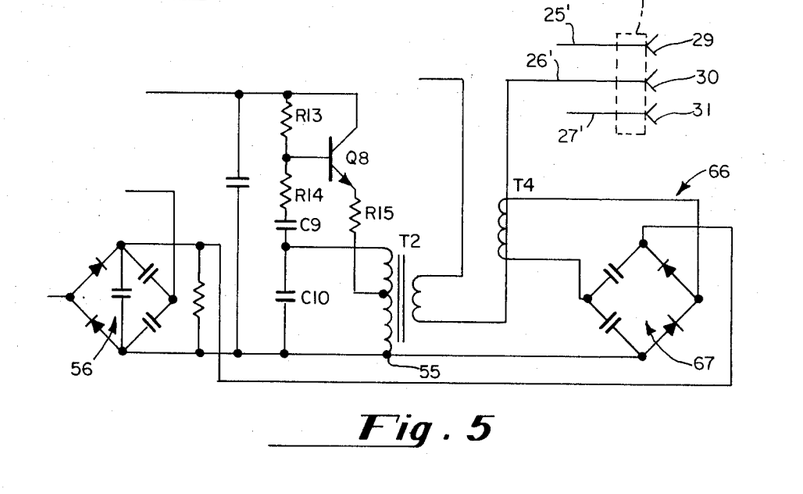
FIG. 5 is a second embodiment of a circuit for providing overload current protection.

Instead of providing for the saturation of transformer T2 when an overload condition occurs, it is possible to achieve overload protection by means of an auxiliary sensing circuit 66 such as shown in FIG. 5. Circuit 66 includes current transformer T4 and rectifier doubler 67. Transformer T4 is a toroid through the center of which passes the neutral jumper 26'. The secondary has about 1,000 turns and applies to rectifier 67 a fraction of the load current flowing in the neutral jumper. When the rated load current of receptacle 16 is exceeded, rectifier 67 will supply considerable current to the collector of transistor Q7 of current sensing means 43. This extra current flow will act upon sensing means 43 as if the leakage power current in ground jumper 27' had reached its predetermined level, in that transistor Q7 will stop conducting causing the sensing means to operate control means 44 and disconnect power from the load.

5. Supervision Means and Sensing Means

Figure 6:
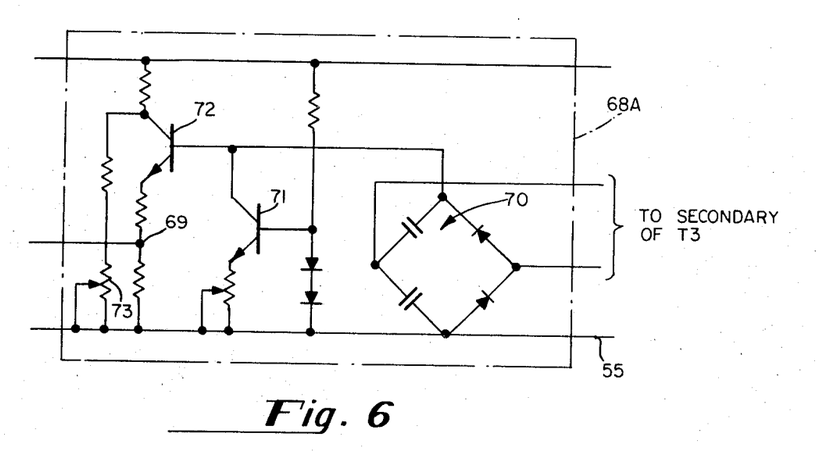
FIGS. 6–8 are different embodiments of the sensing means and supervision means shown in FIG. 2.
Figure 7:
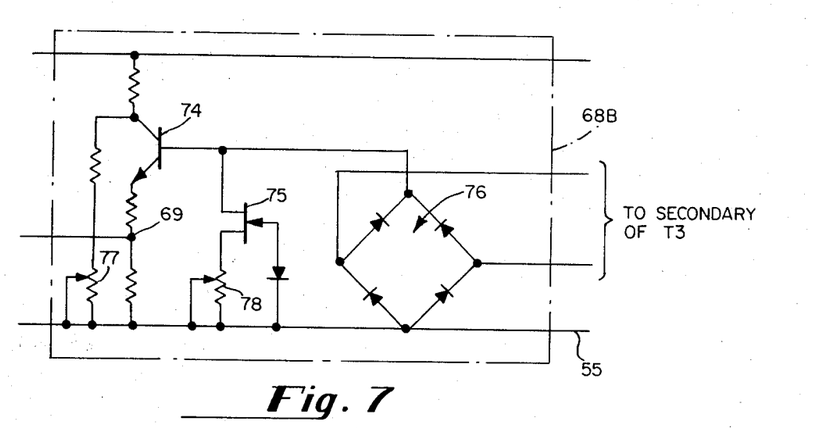
Figure 8:
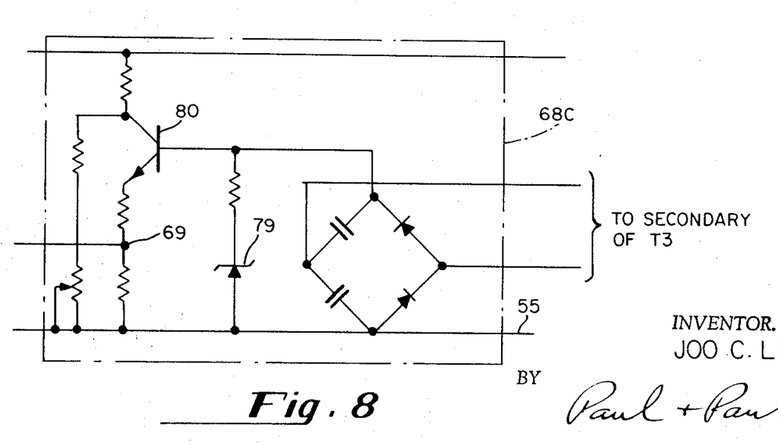

The transistor/SCR configuration of sensing means 43 and the field effect transistor configuration of supervision means 42 can be replaced by any of the circuit configurations 68A, 68B or 68C shown in FIGS. 6-8. When configuration 68A is used to replace means 43, node 69 would correspond to node 58, rectifier doubler 70 would correspond to rectifier-doubler 56, and the input to rectifier 70 would be connected to secondary winding 57 of transformer T3. In such case, potentiometer 73 would be set to hold the collector of transistor 72 at a relatively low voltage so that it would conduct at a low level by reason of the base current furnished by rectifier 70. Transistor 71 would operate substantially the same as transistor Q7 and would draw most of the current from rectifier 70 as long as the leakage power current is less than its predetermined value. The small amount of base current in transistor 72, even when amplified, will not produce sufficient emitter current to raise the voltage at node 69 sufficiently to reverse bias Zener diode CR7. When the leakage power current reaches its predetermined value, transistor 71 is cut-off as its emitter-base junction is reverse biased and all of the current furnished by rectifier 70 is applied to the base of transistor 72 which saturates. The resultant flow of emitter-current raise the voltage at node 69, reverse biases Zener diode CR7 and operates control means 44 as previously described.

When configuration 68A is used to replace supervision means 42, node 69 corresponds to node 59, rectifier-doubler 70 corresponds to rectifier doubler 62, and the input to rectifier 70 is connected to secondary winding 61 of transformer T3. In this case, potentiometer 73 is set to place transistor 72 in its saturated condition. The transformed and rectified supervisory current at the output of rectifier 70 holds transistor 71 cutoff. As the supervisory current decreases below its predetermined level, transistor 71 turns-on and reduces the base current to transistor 72. The resultant decrease in emitter current in transistor 72 lowers the voltage at node 69 and cuts-off transistors Q2 and Q3 of control means 44. Note that the potentiometer in the emitter of transistor 71 permits the user to adjust the critical level of supervisory current at which power is to be disconnected.

Configuration 68B of FIG. 7 is ideally suited for use in supervision means 42. In such case, node 69 corresponds to node 59 of FIG. 2, transistor 74 corresponds to field effect transistor Q4, field effect transistor 75 provides an adjustment by which the predetermined level of supervisory current is established, and the input to full-wave rectifier 76 is connected to winding 61 of transformer T3. Field effect transistor 75 acts as an adjustable low level constant current generator connected to the base of transistor 74. The transformed and rectified supervisory current provided by rectifier 76 is applied to the base of transistor 74 which conducts heavily by reason of the collector bias provided by the setting of potentiometer 77. The voltage at node 69 thus holds transistor Q4 of control means 44 in its active state, and power is applied to the load. As the transformed and rectified supervisory current decreases, conduction of transistor 74 decreases until a voltage at node 69 is reached at which transistor Q3 stops conducting. Power is then removed from the load.

The setting of potentiometer 78 will establish the critical value of current produced at the output of rectifier 76 which will maintain the conduction of transistor 74. Values higher than this critical value will result in cutting off this transistor.

The value of supervisory current flowing in ground jumper 27', which results in the critical value of output of rectifier 76, will be the so-called predetermined level of supervisory current. Such level is determined by the total value of capacitance coupling in power cable 15 between the various leads. For a given type of cable, increasing its length will increase the coupling requiring the critical value of output of rectifier 76 to be compensated in order to detect a discontinuity in the longer cable. Increasing the cable length without compensation would mean that the level of supervisory current that would flow when a discontinuity at connection 38 occurs would exceed the level of current that would flow when a discontinuity occurs in a shorter cable. In such case, the supervision means, set for the shorter cable, would not operate to disconnect power when a break occurs in the longer cable, and a dangerous situation would go undetected. As in the case of potentiometer R8, potentiometer 78 can be calibrated for different lengths of cable.

Configuration 68C in FIG. 8 can also be used for either the sensing or supervision means. In either case, the breakdown of Zener diode 79 in the base circuit of transistor 80 is used for control purposes to sense a current corresponding to an increase in leakage power current above its predetermined level, or to a decrease in supervisory current below its predetermined level.

6. Separate Monitoring of Continuity

While the drawings show and describe the simultaneous use of supervision means 42 and sensing means 43, it is usually not necessary to monitor the chassis potential relative to ground when the equipment is used outside the medical field. In such case, the sensing means circuitry can be eliminated so that only the ground continuity supervision means remains.

Use of supervision means 42 without sensing means 43 permits the monitor to sense ground faults and remove power from the load when they occur. The existence of a ground fault provides an alternative path for the RF current reducing the flow of current in the ground lead. Thus, a ground fault that reduces the RF current in the ground lead below its predetermined value is responded to by supervision means 42 as if a discontinuity in the ground system had occurred, and power is removed from the load by the operation of control means 44.

7. Plug-In Module

Figure 9:
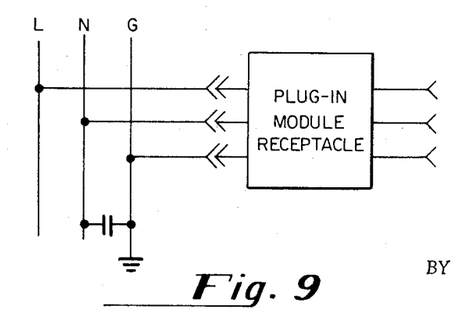
FIG. 9 is a schematic diagram showing the present invention providing a receptacle that can be connected to conventional wiring.

Instead of building module 14 into a wall receptacle, it is also possible to build the module into an adapter that plugs into a wall receptacle and provides an outlet with which a standard three-prong plug can be used. This modification is shown in FIG. 9 and converts a conventional wall receptacle into a safe power source.

K. Incorporation into Equipment

Figure 10:
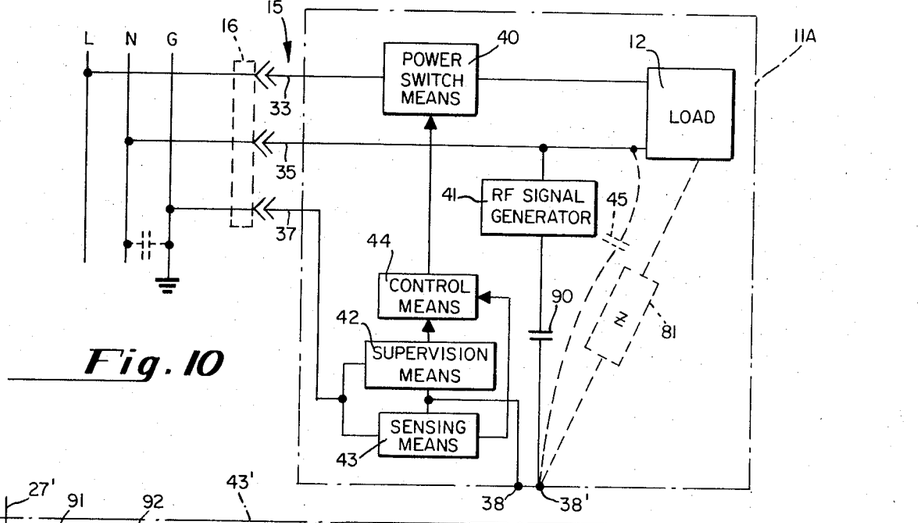
FIG. 10 is a block diagram showing the invention incorporated directly into a piece of electrical equipment.

Instead of mounting module 14 in a receptacle into which the plug of a power cable is inserted, it is also possible to install the module directly into the equipment as shown in FIG. 10. In such case, chassis 11A would contain power switch means 40 connected in line lead 33 of power cable 15, RF signal generator 41 connected between neutral lead 35 of the cable and the chassis, supervision means 42 and sensing means 43 connected in the ground lead, and control means 44.

Leakage power current will flow through ground lead 37 by reason of the coupling between the load and the chassis as indicated by the impedance 81. Detection of this current by sensing means 43 is the same as previously described.

Generator 41 is connected to neutral lead 35 and to the chassis at node 38' through coupling capacitor 90. Supervisory current will flow through coupling capacitor 45 to ground lead 37 when connections 38 and 38' are secure. Detection of supervisory current in the ground lead is the same as previously described.

L. Combination of Supervision and Sensing Means

Figure 11:
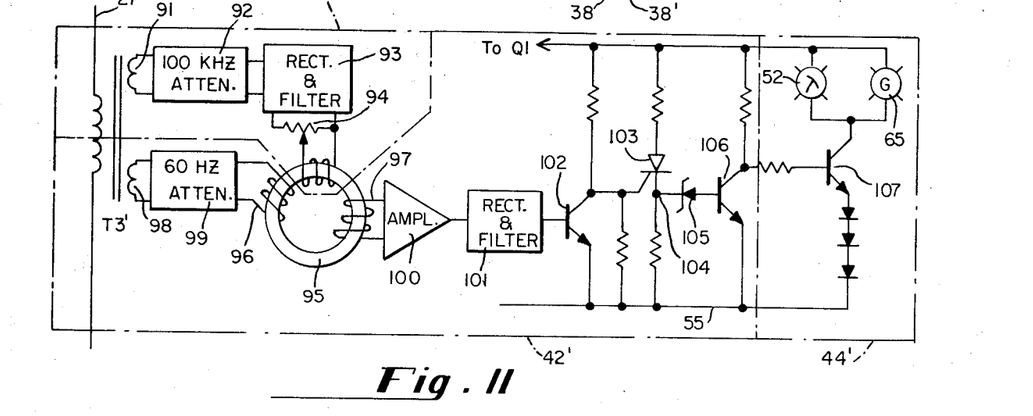
FIG. 11 is a block diagram showing a modification of the supervisory and current sensing means of the present invention.

FIG. 11 shows a further modification for monitoring the level of power leakage current and the presence of supervisory current flowing the ground lead 27'. In the ground current sensing means 43' of this embodiment, secondary 91 of transformer T3' is shunted by R-C circuit 92 which attenuates the 100 KHz signal coupled through the transformer and passes only the 60 Hz signal which is related to the power leakage current flowing in lead 27'. The 60 Hz signal is rectified and filtered by network 93 whose output is a D.C. signal of an amplitude proportional to the level of power leakage current in lead 27'. A preselected portion of this D.C. signal is picked off by potentiometer 94 and applied as a bias to saturable reactor 95 in the shape of a toroid. By properly adjusting potentiometer 94, reactor 95 will saturate when the leakage power current in lead 27' reaches the predetermined level at which the chassis voltage would be 5 millivolts above ground. When saturation of reactor 95 occurs, the core will be incapable of transferring an A.C. signal from input winding 96 to output winding 97.

In the ground continuity supervision means 42' of this embodiment, secondary winding 98 of transformer T3 is shunted by R-C circuit 99 which attenuates any 60 Hz signal present in this secondary arising from power leakage current in lead 27'. As a consequence, the signal present in the input winding 96 of reactor 95 is a 100 KHz signal related to the level of supervisory current flowing in lead 27'. Until reactor 95 saturates, a 100 KHz signal appears in output winding 97. The signal is amplified by amplifier 100, and applied to rectifier filter 101 which produces a D.C. signal that supplies the base of transistor 102 which is biased by the voltage at the emitter of transistor Q1. The presence of base current maintains transistor 102 in its saturated state with the result that the gate electrode of silicon controlled rectifier 103 holds the latter in its nonconducting state. The voltage at node 104 at the cathode of controlled rectifier 103 is at the reference level 55 with the result that Zener diode 105 is not reverse biased. AS a consequence, transistor 106 is non-conducting; and the collector resistor of transistor 106 provides self-bias for transistor 107 which conducts causing lamps 52 and 65 to be illuminated.

Summarizing, lamps 52 and 65 will be illuminated as long as a signal appears in output winding 97 of reactor 95. Such signal will be present when supervisory current flows in lead 27' and when the leakage power current is less than its predetermined value. When the leakage power current exceeds its predetermined value and the core of reactor 95 saturates, the A.C. signal in winding 97 will disappear, and transistor 102 will stop conducting. The resultant voltage at the gate electrode of controlled rectifier 103 will fire the controlled rectifier causing current to flow through the cathode resistor of the controlled rectifier thus raising the voltage at node 104 and reverse-biasing Zener diode 105. Transistor 106 is now forwardly biased and conducts causing the base of transistor 107 to be held at substantially the reference voltage 55. Such action causes transistor 107 to stop conducting extinguishing lamps 52 and 65.

Transistor 107 and lamps 52 and 65 constitute modified control means 44' which operates to enable and disable power switch means 40 in the same manner as previously described. When switch means is disabled by control means 44' (e.g., when the flow of leakage power current in lead 27' reaches its predetermined value), the flow of leakage current in lead 27' ceases. The core of reactor 95 becomes unsaturated as a result. Supervisory current (due to the operation of RF generator 41 which is not shown in FIG. 11) continues to flow in lead 27', however, causing a signal to again appear at input 97. Transistor 102 again conducts but has no effect on controlled rectifier 103 which remains conducting until manual reset button 48 is depressed.

M. Four Wire, Three-Phase System Protection

A four wire, three-phase system includes three line leads (instead of a single line lead in the case of a single phase system), and one neutral lead. Each of these leads is capacitively coupled to a ground lead by reason of the proximity of the various conductors, and the leakage of the power transformer forming a part of the power source of the system.

The present invention can be utilized in a four wire, three phase system by serially incorporating the secondary of the RF oscillator transformer into the neutral lead, and by serially incorporating the primary of the current transformer into the ground lead. With this arrangement, the use of supervision means 42 alone permits continuity of the ground connection, or the occurrence of ground faults to be monitored; while the use of both supervision means 42 and sensing means 43 gives the added capability of monitoring chassis potential relative to ground.

N. Component Values of FIG. 2

| Symbol | Component | Value |
|---|---|---|
| T1 | Transformer | 120:12:12:12 |
| T2 | Transformer (powdered core) | primary:33 turns No. 28 AWG tapped at 30 turns secondary:5 turns no. 16 AWG |
| T3 | Transformer (powdered core) | primary:40 turns no. 16 AWG secondary(61):30 turns no. 28 AWG secondary(57):100 turns no. 28 AWG |
| SCR1, 2, 3 | Silicon controlled rectifier | 2N5060 |
| R1, 1, 16, 17 | Resistor | 1 K ohm |
| R2 | Resistor | 4.7 K |
| R3 | Resistor | 4.7 K ohm |
| R4 | Resistor | 2 K ohm |
| R5 | Resistor | 560 K ohm |
| R6 | Resistor | 470 ohm |
| R7, 10 | Resistor | 10 K ohm |
| R8, 9 | Variable Resistor | 2 K |
| R11 | Resistor | 100 K ohm |
| R12 | Resistor | 560 K |
| R13 | Resistor | 33 K ohm |
| R14 | Resistor | 100 ohm |
| R15 | Variable | 200 ohm |
| R18, 19 | Resistor | 20 ohm |
| R20 | Resistor | 2 K |
| C1, 2 | Capacitor | 200 mfd 25 V |
| C3, 4, 7, 8 9, 10, 13, 14 | Capacitor | .01 mf 25 V |
| C5, 6 | Capacitor | .1 mf 25 V |
| C11, 12 | Capacitor | |
| CR1-4, 8-13 | Diode | 10D1 |
| CR5 | Zener diode | 1N960 |
| CR6, 7 | Zener diode | 1N751 |
| Q1 | Transistor | 40372 |
| Q2 | Transistor | 2N404 |
| Q3, 5 | Transistor | 2N3565 |
| Q4 | N-channel F.E.T. | 2N5457 |
| Q7 | Transistor | 2N3566 |
| Q8 | Transistor | 2N3053 |

What is claimed is:

1. A monitoring system for controlling the application of power from a grounded power source to a chassis-mounted load by way of a cable that includes a plurality of leads, comprising:
   a. power switch means associated with said leads for applying power from said source to said load when said power switch means is enabled and to disconnect said source when said power switch means is disabled;
   b. a two-state control means for enabling said power switch means when said control means has a first state and disabling said power switch means when said control means has a second state;
   c. means to inject an RF signal into one of said leads for producing an RF signal in a second of said leads;
   d. supervision means associated with said second lead for switching said control means to said second state when the RF signal in said second lead decreases below a predetermined level; and
   e. means responsive to the flow of power current from said source for causing said control means to switch to said second state when said power current exceeds a predetermined value.

2. A monitoring system according to claim 1 wherein said second lead is attached to said chassis, including ground current sensing means associated with said second lead for switching said control means to said second state when the potential of said chassis relative to ground exceeds a predetermined value.

3. A monitoring system according to claim 1 wherein:
   a. an RF signal generator is coupled by a transformer into said one lead and an RF signal appears in said second lead by reason of the coupling between said leads and between said load and said chassis; and
   b. said supervision means includes a current transformer coupled to said second lead, a rectifier for rectifying the output of said current transformer, a biasable active device for operating said control means when the bias on said device exceeds a predetermined level, and bias means responsive to the output of said rectifier for providing bias to said active device.

4. A monitoring system according to claim 3 wherein said bias means is adjustable for establishing the level of the output of said rectifier at which said active device will operate said control means whereby the cable length can be compensated for.

5. A monitoring system according to claim 3 including means functionally relating the coupling of said transformer to the level of power current drawn from said source whereby the flow of more than a preselected level of power current reduces the RF signal in said ground lead below said predetermined level.

6. Monitor means for use with a chassis containing an electrical load connected to a grounded power source by way of at least one line lead, a neutral lead, and a ground lead attached to said chassis, comprising:
   a. operable control means;
   b. an RF signal generator associated with said leads whereby said load is adapted to couple an RF signal into said ground lead; and
   c. supervision means responsive to the level of the RF signal in said ground lead for operating said control means when said level decreases below a predetermined level.

7. Monitor means according to claim 6 including ground current sensing means associated with said ground lead for operating said control means when leakage power current in said ground lead exceeds a predetermined level.

8. Monitor means according to claim 6 including power switch means connected to said leads and responsive to the operation of said control means for disconnecting said power source from said load.

9. Monitor means according to claim 6 wherein:
   a. the output of said RF signal generator is coupled by means of a transformer into said neutral lead;
   b. said supervision means includes a current transformer coupled to said ground lead, a rectifier for rectifying the output of said current transformer, a biasable active device for operating said control means when the bias on said device exceeds a predetermined level, and bias means responsive to the output of said rectifier for providing bias to said active device.

10. Monitor means according to claim 9 where the transformer by which the RF signal is coupled into said neutral lead saturates when the flow of power current from said source exceeds a predetermined value whereby the bias on said device decreases below said predetermined level.

11. Monitor means according to claim 10 including power switch means connected to said leads and responsive to the operation of said control means for disconnecting said power source from said load.

12. Monitor means according to claim 9 wherein said current transformer saturates when the flow of power current in said ground lead exceeds a predetermined value whereby the bias on said device decreases below said predetermined level.

13. A monitor module for use with a grounded power source having a line bus, a neutral bus, and a ground bus comprising:
   a. a receptacle having a line contact, a neutral contact and a ground contact corresponding to the buses, and adapted to receive the plug of a power cable by which an electrical load can be connected to said source;
   b. RF signal generator means between one of said buses and its corresponding contact for injecting supervisory current into said cable;
   c. supervision means between a second bus and its corresponding contact for detecting the level of supervisory current flowing through the last mentioned contact; and
   d. control means operable by said supervision means when the flow of said supervisory current through the contact corresponding to said second bus decreases below a predetermined level.

14. A monitor module according to claim 13 including power switch means between the line bus and its corresponding contact of said receptacle, said power switch being responsive to said control means for connecting the line contact to the line bus only while the supervisory current flowing through the contact corresponding to said second bus exceeds said predetermined level.

15. A monitor module according to claim 13 including means responsive to the flow of power current through the contact corresponding to said second bus for operating said control means when the level of the last mentioned flow exceeds a predetermined level.

16. A monitor module according to claim 13 wherein said RF generator means is constructed and arranged so that the amount of supervisory current injected into said cable is functionally related to the level of power current flowing through the contact corresponding to said one bus.

17. A monitor module according to claim 13 wherein said supervision means is constructed and arranged so that the level of supervisory current able to be detected thereby is functionally related to the level of leakage power current flowing through the contact corresponding to said second bus.

18. A monitor module according to claim 13 including a power switch responsive to the operation of said control means for disconnecting power from said source to said line when the supervisory current flowing through the contact corresponding to said second bus is less than a predetermined value.

19. A method for monitoring the continuity of a connection between a chassis and a system ground through a ground lead in a cable providing power to an electrical load in the chassis by means of a line lead and a neutral lead, comprising:
   a. injecting an RF signal into a first lead other than said ground lead; and
   b. detecting the presence of an RF signal in the ground lead.

20. The method of claim 19 including the step of providing a passive component between said first lead and said chassis.

21. Monitor means associated with the application of power to an electrical load from a source comprising a line bus, a neutral bus, and a ground bus, comprising:
   a. interconnection means adapted to connect said load to the buses for energizing said load;
   b. said interconnection means including a lead adapted to be connected to one bus, and an RF signal generator adapted to be connected between another bus and said load for causing RF current to flow in said lead;
   c. two-state control means; and
   d. means responsive to the level of RF current in said lead for determining, at least in part, the state of said control means when said RF current decreases below a predetermined level.

22. Monitor means for use with a chassis containing an electrical load connected to a grounded power source by way of a line lead, a neutral lead, and a ground lead attached to said chassis, comprising:
   a. a two-state control means having a first state only when the connection between the chassis and the power source ground is continuous and the potential difference is less than a predetermined value, and having a second state either when said connection is discontinuous or when said potential difference is more than a predetermined value;
   b. ground current sensing means responsive to the potential difference between the chassis and the power source ground for determining, at least in part, the state of said control means; and
   c. ground continuity supervision means responsive to the continuity of the connection between the chassis and the power source ground for determining, at least in part, the state of said control means.

23. Monitor means for use with a chassis containing an electrical load connected to a grounded power source by way of a line lead, a neutral lead, and a ground lead attached to said chassis, comprising:
   A. a two-state control means; and
   B. ground current sensing means responsive to the potential difference between the chassis and the power source ground for determining, at least in part, the state of said control means, and including:

a. a current transformer coupled to said ground lead;
b. a rectifier for rectifying the output of said current transformer;
c. a biasable active device for causing said control means to occupy its first state only when the bias on said device has a predetermined level; and
d. bias means responsive to the output of said rectifier for providing bias to said device.

* * * * *